United States Patent [19]

Akaike et al.

[11] 4,152,832

[45] May 8, 1979

[54] CORD-TYPE CUTTING DEVICE OF MOWING APPARATUS

[75] Inventors: Junichi Akaike, Chofu; Masatoshi Sato, Tokyo, both of Japan

[73] Assignee: Kioritz Corporation, Tokyo, Japan

[21] Appl. No.: 879,850

[22] Filed: Feb. 22, 1978

[30] Foreign Application Priority Data

Nov. 26, 1977 [JP] Japan .......................... 52-157885[U]

[51] Int. Cl.² .................. A01D 55/18; A01G 3/06
[52] U.S. Cl. ....................................... 30/276; 56/12.7
[58] Field of Search .................. 30/276, 347; 56/12.7, 56/295

[56] References Cited

U.S. PATENT DOCUMENTS

| 4,091,538 | 5/1978 | Akijama | 30/276 |
| 4,095,338 | 6/1978 | Naohiko et al. | 30/276 |
| 4,097,991 | 7/1978 | Prouly | 30/276 |

Primary Examiner—Jimmy C. Peters
Attorney, Agent, or Firm—Karl W. Flocks

[57] ABSTRACT

A cord-type cutting device of mowing apparatus having engaging portions formed in a cord reel and a lower cover and in a cord reel casing and the lower cover, and including a nut dislodging preventing member attached to the lower end of a main shaft formed in its lower end portion with an externally threaded portion for threadably fitting a nut thereon to force the lower cover against the cord reel casing. The nut dislodging preventing member provides the externally threaded portion with a predetermined nut loosening allowance thereby preventing dislodging of the nut when the latter is loosened.

2 Claims, 3 Drawing Figures

CORD-TYPE CUTTING DEVICE OF MOWING APPARATUS

BACKGROUND OF THE INVENTION

This invention relates to improvements in a cord-type cutting device of mowing apparatus.

Heretofore, cord-type cutting devices of mowing apparatus wherein adjustments of the length of the cord blade are effected by varying the relative positions of the cord pay-out port and the cord reel have had disadvantages in that dust or other foreign matter invades the cutting device during use and interferes with the smooth movement of the cord reel, and that when the lower cover is loosened too much the cord reel is dislodged from the device.

SUMMARY OF THE INVENTION

A main object of this invention is to provide improvements in a cord-type cutting device of mowing apparatus for obviating the aforementioned disadvantages of the prior art by facilitating the operation of adjusting the length of the cord blade of the cord-type cutting device and the operation of disassembling the device and enabling these operations to be performed positively, and by preventing an inadvertent change in the length of the cord blade while the cord-type cutting device is being in use. According to the invention, engaging portions are formed in the cord reel and the lower cover and in the cord reel casing and the lower cover, and a nut dislodging preventing member is attached to the externally threaded portion of the main shaft for threadably fitting a nut thereon for forcing the lower cover against the cord reel casing, the nut dislodging preventing member providing the externally threaded portion with a predetermined nut loosening allowance thereby preventing dislodging of the nut when the latter is loosened.

Another object of the invention is to form a multitude of radially directed grooves in each of the engaging portions formed in the cord reel casing and the lower cover, the radially directed grooves engaging one another so as to thereby permit fine adjustments of the length of the cord blade to be effected.

DESCRIPTION OF THE PREFERRED EMBODIMENT

The invention will now be described by referring to a preferred embodiment thereof shown in the accompanying drawings.

Figure 1:
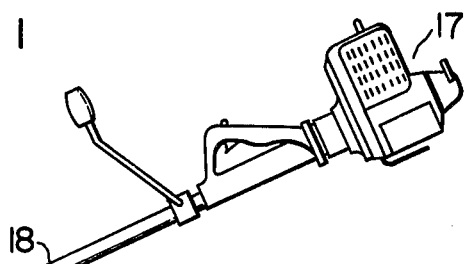
FIG. 1 is a side view of a mowing apparatus incorporating therein the cord-type cutting device according to the invention.

FIG. 1 shows a portable-type mowing apparatus having the cord-type cutting device according to the invention. The mowing apparatus comprises an engine 17, an operating lever 18, the cord-type cutting device 16 and a cord blade 6 payed out of the cutting device 16.

Figure 2:
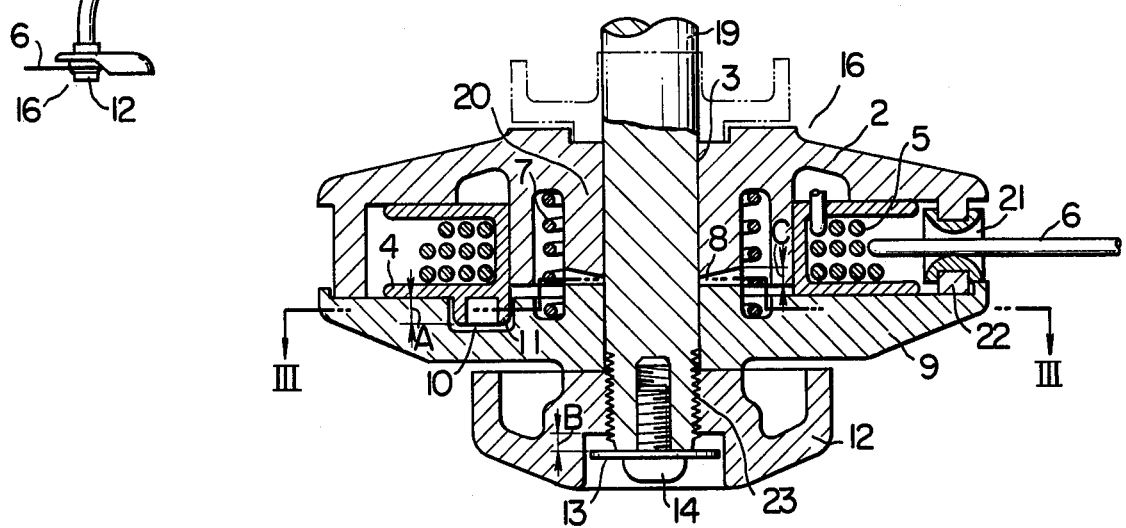
FIG. 2 is a vertical sectional view of the cord-type cutting device comprising one embodiment of the invention.
Figure 3:
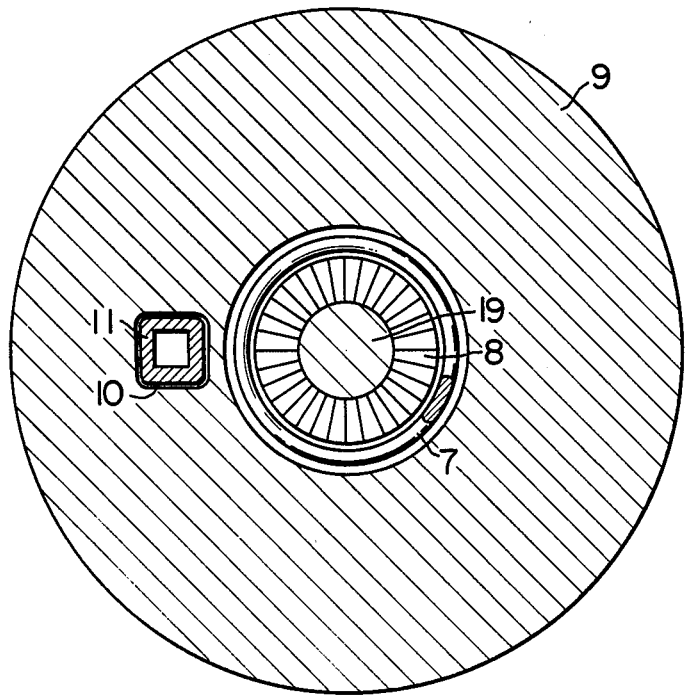
FIG. 3 is a sectional view taken along the line III—III in FIG. 2.

FIG. 2 is a vertical sectional view of the cord-type cutting device 16 according to the invention, and FIG. 3 is a transverse sectional view taken along the line III—III in FIG. 2.

In FIGS. 2 and 3, the cord-type cutting device 16 comprises a cord reel casing 2 including a hub 20 for rotatably fitting a cord reel 4 thereon, and a peripheral wall 22. A main shaft 19 extends through the central portion of the hub 20 of the cord-reel casing 2 and is maintained in engagement therewith at an interface 3. The cord reel 4 has wound thereon a cord 5 serving as a cord blade 6 when payed out of the reel 4. The cord reel casing 2 is formed in one portion of the peripheral wall 22 with a cord blade pay-out port 21. The cord reel 4 is formed on its underside with at least one engaging projection 11. The cord type cutting device 16 further comprises a lower cover 9 rotatably mounted on the main shaft 19 extending downwardly through the hub 20 of the cord reel casing 2 and formed on its upper surface with an engaging recess 10 adapted to receive therein the engaging projection 11 of the cord reel 4. A compression spring 7 is mounted in annular grooves formed in the hub 20 of the cord reel casing 2 and the lower cover 9 for urging by its biasing force the cord reel casing 2 and the lower cover 9 to move away from each other. The cord reel casing 2 and the lower cover 9 are formed at their interface with engaging portions 8. The main shaft 19 is formed at its lower end portion with an externally threaded portion 23 for threadably fitting thereon a nut 12. A nut dislodging preventing member 13 is secured by means of a screw 14 to the low lower end of the main shaft 19 for preventing dislodging of the nut 12. The nut dislodging preventing member 13 provides the externally threaded portion with a loosening allowance B for the nut 12.

The engaging projection 11 and the engaging recess 10 engage each other for a distance of A, the loosening allowance of the nut 12 is B as aforementioned, and the distance covered by the engaging portions 8 of the cord reel casing 2 and the lower cover 9 is C. The aforementioned parts are designed and constructed such that $A > B \geq C$.

In the cord-type cutting device 16 constructed as aforesaid according to the invention, fully tightening the nut 12 enables the cord reel 4 to be firmly held between the cord reel casing 2 and the lower cover 9. In this condition, the relative positions of the cord reel casing 2 and the lower cover 9 are regulated by the engaging portions 8, and the relative positions of the cord reel 4 and the lower cover 9 are regulated by the engagement of the engaging projection 11 in the engaging recess 10. Thus, there is no danger of the cord blade 6 extending outwardly through the cord blade pay-out port 21 inadvertently undergoing changes in lingth during operation.

During operation, the cord blade 6 may be damaged and become short in length, making it necessary to pay out a further length of cord 5 from the cord reel 4. If this is the case, the nut 12 is loosened until it abuts against the nut dislodging preventing member 13. This permits the lower cover 9 to be moved away from the cord reel casing 2 by the biasing force of the compression spring 7, so that the lower cover 9 and the cord reel casing 2 are separated from each other as they are disengaged at the engaging portions 8. Thus the cord 5 can be withdrawn freely from the reel 4 in any length as desired to replenish the cord blade 6. However, since the engaging projection 11 and the engaging recess 10 still remain in engagement with each other because $A > B \geq C$ as aforesaid, the cord reel 4 remains in engagement with the lower cover 9 and they are rotatable relative to the cord reel casing 2.

Therefore, even if the cord reel 4 does not move smoothly, it is possible to readily withdraw the cord 5 in any length as desired to replenish the cord blade 6 by rotating the lower cover 9 through an angle corresponding to the desired length of the cord 5 to be payed out in a direction in which the cord 5 wound on the cord reel 4 is payed out and then by fully tightening the nut 12.

It is to be understood that the cord reel and the lower cover need not be in engagement with each other. What is essential is that they be brought into engagement with each other when they are clamped together.

From the foregoing description, it will be appreciated that in the cord cutting device according to the invention the compression spring 7 urges by its biasing force the reel casing 2 and the lower cover 9 to move way from each other and that the cord reel 2 and the lower cover 9 are maintained in engagement with each other at all times. By virtue of these features, it is possible to readily perform the operation of adjusting the length of the cord blade 6 or the operation of disassembling the device even if the relative movements of the parts are impaired by dust or other foreign matter invading the device during operation.

The feature that the nut dislodging preventing member 13 is provided for preventing dislodging of the nut 12 is effective to avoid dislodging of the cord reel 4 due to excess loosening of the nut 12 when adjustments of the length of the cord blade 6 are effected and to avoid disengagement of the lower cover 9 from the cord reel 4.

The feature that the radially directed grooves are formed in each of the engaging portions 8 of the cord reel casing 2 and the lower cover 9 permits fine adjustments of the length of the cord blade 6 to be effected.

What is claimed is:

1. A cord-type cutting device of mowing apparatus comprising:
   a cord reel having mounted thereon a cord serving as a cord blade and formed on its underside with at least one engaging projection;
   a cord reel casing including a hub for rotatably fitting said cord reel thereon and a cord pay-out port for paying out the cord to provide a cord blade of a desired length;
   a lower cover formed on its upper surface with an engaging recess adapted to receive said engaging projection therein;
   said cord reel casing and said lower cover each being formed with engaging portions at their interface where the cord reel casing and the lower cover are brought into and out of engagement with each other against the biasing force of a compression spring;
   a main shaft extending through the hub of said cord reel casing and said lower cover and being formed at its lower end portion with an externally threaded portion for threadably fitting thereon a nut so as to permit these parts to act as a unit; and
   a nut dislodging preventing member attached to a lower end of said main shaft and providing the externally threaded portion with a loosening allowance for said nut, so that when said nut is loosened until it abuts against the nut dislodging preventing member, the engaging portions of the cord reel casing and the lower cover are brought out of engagement with each other but the cord reel and the lower cover remain in engagement with each other through the engagin projection and the engaging recess.

2. A cord-type cutting device as claimed in claim 1, wherein said engaging portions of the cord reel casing and the lower cover are each formed with radially directed grooves, the radially directed grooves of the cord reel casing and the radially directed grooves of the lower cover being adapted to engage each other.

* * * * *